United States Patent Office 3,205,282
Patented Sept. 7, 1965

3,205,282
ISOMERISATION OF OLEFINIC COMPOUNDS
Maurice Barrington Sparke and Alan John Maurice Wenham, both of Sunbury-on-Thames, England, assignors to The British Petroleum Company Limited, London, England, a British joint-stock corporation
No Drawing. Filed Nov. 22, 1961, Ser. No. 154,341
Claims priority, application Great Britain, Jan. 4, 1961, 337/61
8 Claims. (Cl. 260—683.2)

This invention relates to an improved process for the isomerisation of of olefinic compounds, and more particularly to a process for isomerising branched chain olefins such as the methylpentenes.

It has been disclosed that palladous chloride reacts with certain organic compounds to form complexes of the structures:

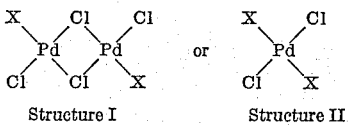

Structure I          Structure II where X is an organic compound.

A typical organic compound which reacts with palladous chloride in this manner to form a complex of Structure II is benzo-nitrile.

It has been disclosed that palladous chloride reacts by addition to certain olefins to form a complex of the structure:

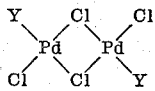

where Y is an olefin.

It has also been disclosed that certain complexes of the structure

for example where X is benzonitrile, react with an olefin by a displacement reaction to form a compound of the structure

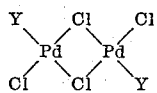

where Y is an olefin.

It is an object of the present invention to isomerize olefins, particularly branched-chain olefins, using as a catalyst, complex compounds which may be exemplified by the type set out above. It is a further object of the present invention to isomerize methylpentenes such that the useful isoprene precursor compound 2-methylpentene-2 is formed.

According to the present invention a branched-chain olefin or a mixture consisting essentially of branched-chain olefins is isomerised by reaction with a complex of an unsaturated organic compound with a halide of a metal selected from platinum, palladium, rhodium, ruthenium and iridium and a desired isomer or mixture of isomers is recovered from the product.

Usually and preferably the isomerisation reaction is carried out in the absence of material, other than said complex, which is capable, under the isomerisation conditions, of promoting or modifying the isomerisation reaction. Examples of such compounds are halogenated straight-chain organic acids and phosphorus oxychlorides.

The complex may be pre-formed and brought into contact with the feedstock; alternatively the complex may be formed under the isomerisation conditions by reaction of the metal halide complex-forming compound with an unsaturated organic compound present in the feedstock, for example an olefinic hydrocarbon.

According to one aspect of the present invention a feedstock consisting of or containing a branched-chain olefin or a mixture of branched-chain olefins is isomerised in contact with a halide of a metal selected from platinum, palladium, rhodium, ruthenium and iridium and a desired isomer or mixture of isomers is recovered from the product.

It will be understood that the feedstock will consist of or comprise a branched-chain olefin or a mixture comprising branched-chain olefins which is capable of forming isomers, said mixture not being the thermodynamic equilibrium mixture corresponding to the temperature at which isomerisation is to be effected. It will further be understood that the feedstock may comprise compounds other than branched-chain olefins that themselves may or may not be susceptible to isomerisation under the conditions employed.

The isomerisation reaction may be carried out with the feedstock in either liquid or gaseous phase. Suitably the reaction is carried out in liquid phase at the boiling point of the feedstock, under the pressure employed, with recovery of the total product in vapour phase.

The desired isomer or mixture of isomers may be recovered by any suitable separation process, either physical or chemical. Preferably undesired isomers are recycled to the feedstock.

Typical separation processes are fractional distillation, extractive distillation, azeotropic distillation, solvent extraction, urea adduction, molecular sieve extraction and acid extraction.

Preferably the branched-chain olefin of the feedstock is a mono-olefin or mixture of mono-olefins having 4–10 carbon atoms per molecule.

The process of this invention is of particular value when applied to the treatment of a feedstock consisting of one or more methylpentenes, such that 2-methylpentene-2 is produced and which may be separated from the reaction products and used as a precursor for the formation of isoprene.

In general it will usually be desirable for the feedstock and reaction system to be free of water, of oxygen and of sulphur-containing compounds.

The invention is illustrated but not limited with reference to the following examples.

*Example 1*

20 ml. of 4-methylpentene-1 (99.8% pure) was boiled with 1 gram of palladium chloride. After one hour the organic material removed by distillation had the composition:

| Components: | Percent wt. |
|---|---|
| 4-methylpentene-1 | 0.5 |
| 4-methylpentene-2 | 14.0 |
| 2-methylpentene-2 | 69.6 |
| 2-methylpentene-1 | 13.8 |

*Example 2*

1 gram of palladium chloride was placed in the thimble of a Soxhlet "hot" extraction apparatus and extracted with 50 ml. of 4-methylpentene-1 (99.8% pure). The change in composition (percent by wt.) with time of a sample of olefin recovered by distillation was as follows:

| Time, min | 0 | 15 | 30 | 45 | 60 | 75 | 90 | 105 | 120 |
|---|---|---|---|---|---|---|---|---|---|
| 4-methylpentene-1, percent | 99.8 | 99.8 | 95.1 | 88.4 | 56.2 | 37.6 | 21.0 | 15.3 | 11.3 |
| 4-methylpentene-2, percent | | | 4.9 | 10.0 | 25.4 | 34.4 | 38.8 | 38.9 | 35.0 |
| 2-methylpentene-2, percent | | | | 1.6 | 14.4 | 20.5 | 29.9 | 34.3 | 41.5 |
| 2-methylpentene-1, percent | | | | | 4.0 | 7.4 | 10.3 | 11.5 | 12.2 |

*Example 3*

1 gram of palladium chloride was heated to 100° C. with 15 ml. of benzonitrile for 3 hours and filtered while hot. The cooled filtrate deposited yellow crystals of di benzonitrile palladium dichloride which were filtered off and washed with isooctane and finally dried at room temperature.

25 ml. of 4-methylpentene-1 (99.8% pure) and constituting 0.198 mole was boiled with 200 milligrams of the above complex (containing 0.000521 gram atoms of Pd).

The change in composition (percent by wt.) with time of a sample of olefin recovered by distillation was as follows:

| Time, min | 0 | 16 | 21 | 34 | 43 | 53 | 161 |
|---|---|---|---|---|---|---|---|
| 4-methylpentene-1, percent | 99.8 | 71.2 | 8.1 | 1.0 | 0.9 | 0.8 | 0.8 |
| 4-methylpentene-2, percent | | 16.0 | 34.1 | 13.7 | 13.7 | 13.4 | 13.6 |
| 2-methylpentene-2, percent | | 9.2 | 43.5 | 70.8 | 70.8 | 71.3 | 70.9 |
| 2-methylpentene-1, percent | | 3.6 | 14.3 | 14.5 | 14.6 | 14.5 | 14.7 |

In this example the ratio of moles olefin to gram atom palladium was 380.

*Example 4*

25 ml. (16.6 grams, 0.198 mole) of 4-methylpentene-1 (99.8% pure) was boiled with 30 milligrams (0.000078 gram atom Pd) of the benzonitrile palladium chloride complex prepared as described in Example 3.

The change in composition (percent by wt.) with time of a sample of olefin recovered by distillation was as follows:

| Time, min | 12 | 22 | 37 | 52 | 69 | 97 | 202 |
|---|---|---|---|---|---|---|---|
| 4-methylpentene-1 | 99.4 | 94.2 | 79.8 | 56.7 | 18.8 | 1.7 | 0.8 |
| 4-methylpentene-2 | 0.2 | 4.2 | 13.5 | 26.8 | 42.4 | 25.1 | 15.2 |
| 2-methylpentene-2 | 0.4 | 1.3 | 4.8 | 11.9 | 28.6 | 59.3 | 69.5 |
| 2-methylpentene-1 | | 0.3 | 1.9 | 4.6 | 10.2 | 13.9 | 14.5 |

In this example the ratio of moles of olefin to gram atom of palladium was 2538.

*Example 5*

100 ml. of 100% pure 2-methylpentene-1 were boiled under reflux with 0.31 gm. of a palladous chloride-benzonitrile complex for 20 minutes. The product contained 73.6% 2-methylpentene-2, 13.1% 2-methylpentene-1, 12.8% 4-methylpentene-2 and 0.5% 4-methylpentene-1.

*Example 6*

100 ml. of 100% pure 4-methylpentene-2 were boiled under reflux with 0.31 gm. of palladous chloride-benzonitrile complex for 1.3 hours. The product contained 75.9% 2-methylpentene-2, 12.1% 2-methylpentene-1, 11.5% 4-methylpentene-2 and 0.5% 4-methylpentene-1.

*Example 7*

The experiment of Example 6 was repeated except that the feed was 97.2% pure 2-methylpentene-2. After 1.25 hours the product contained 77.5% 2-methylpentene-2, 12.0% 2-methylpentene-1, 7.4% 4-methylpentene-2 and 0.7% 4-methylpentene-1.

*Example 8*

A mixture containing 92.5% 4-methylpentene-1, 2.6% 4-methylpentene-2 and 4.9% 2-methylpentene-1 was isomerised by boiling 100 mls. of the mixture under reflux with 0.21 gm. of a palladous chloride-cyclohexene complex $[C_6H_{10}\cdot PdCl_2]_2$. After 0.9 hour an equilibrium mixture of methylpentenes was obtained corresponding in percentage composition to the product of Example 7.

*Example 9*

The process of Example 8 was repeated using the identical feedstock but using, as catalyst, 0.0832 gm. of an ethylene-palladous chloride complex $[C_2H_4PdCl_2]_2$. After 1.25 hours an equilibrium mixture of methylpentenes was obtained corresponding in percentage composition to the product of Example 7.

We claim:

1. A process for isomerizing a feedstock consisting essentially of at least one methylpentene to produce 2-methylpentene-2 comprising; boiling the feedstock in the presence of a catalyst which consists of a complex of an olefin with a palladium halide for a period of time up to about 200 minutes and under conditions of temperature and pressure to produce a mixture consisting predominantly of 2-methylpentene-2, and recovering the said 2-methylpentene-2 from the reaction mixture as a desired product.

2. A process for isomerizing a feedstock consisting essentially of at least one methylpentene to produce 2-methylpentene-2 as a desired product comprising; introducing into said feedstock a palladium halide, raising the temperature of the resulting mixture to the boiling point of said feedstock under the pressure employed whereby the halide reacts with said feedstock to form a catalyst which consists of a complex of the said feedstock with the said halide, maintaining the reaction temperature at the boiling point of the feedstock under the pressure employed for a time up to about 200 minutes to produce a mixture consisting predominantly of 2-methylpentene-2, and recovering the 2-methylpentene-2 from the reaction mixture as a desired product.

3. A process according to claim 1 in which said halide is palladous chloride.

4. A process according to claim 1 in which the said complex is pre-formed before being brought into contact with the feedstock.

5. A process according to claim 1 in which the said complex is formed in situ by reaction of said halide with the feed olefin under the isomerisation conditions employed.

6. A process according to claim 1 in which the said complex is formed in situ by reaction of a palladium halide/benzonitrile complex with the feedstock under the isomerisation conditions employed.

7. A process according to claim 1 in which the said complex is formed in situ by reaction of a palladium halide/olefin complex with the feedstock under the isomerisation conditions employed.

8. A process according to claim 1 in which the said complex is a displacement reaction product formed in situ, under the isomerisation conditions employed, by reaction of said feedstock with a pre-formed complex of a palladium halide and an organic compound selected from the group consisting of benzonitrile, cyclohexene, and ethylene.

References Cited by the Examiner

UNITED STATES PATENTS

| | | | |
|---|---|---|---|
| 2,861,960 | 11/58 | De Boer et al. | 252—466 |
| 2,960,550 | 11/60 | Feller et al. | 260—683.2 |
| 2,960,551 | 11/60 | Feller | 260—683.2 |
| 3,013,066 | 12/61 | Alderson | 260—683.15 X |

ALPHONSO D. SULLIVAN, *Primary Examiner.*